(12) United States Patent
Avritch

(10) Patent No.: US 11,101,762 B2
(45) Date of Patent: Aug. 24, 2021

(54) LINEAR MOTOR ACTUATORS

(71) Applicant: Hamilton Sundstrand Corporation, Charlotte, NC (US)

(72) Inventor: Steven A. Avritch, Bristol, CT (US)

(73) Assignee: Hamilton Sundstrand Corporation, Charlotte, NC (US)

(*) Notice: Subject to any disclaimer, the term of this patent is extended or adjusted under 35 U.S.C. 154(b) by 0 days.

(21) Appl. No.: 16/441,368

(22) Filed: Jun. 14, 2019

(65) Prior Publication Data

US 2019/0296675 A1 Sep. 26, 2019

Related U.S. Application Data

(62) Division of application No. 15/287,215, filed on Oct. 6, 2016, now Pat. No. 10,326,398.

(51) Int. Cl.
| | |
|---|---|
| *H02P 25/06* | (2016.01) |
| *H02K 41/03* | (2006.01) |
| *H02K 11/21* | (2016.01) |
| *H02K 11/38* | (2016.01) |
| *H02K 1/12* | (2006.01) |
| *H02K 1/34* | (2006.01) |
| *H02K 16/04* | (2006.01) |
| *H02K 41/02* | (2006.01) |

(52) U.S. Cl.
CPC ............. *H02P 25/06* (2013.01); *H02K 1/12* (2013.01); *H02K 1/34* (2013.01); *H02K 11/21* (2016.01); *H02K 11/38* (2016.01); *H02K 16/04* (2013.01); *H02K 41/02* (2013.01); *H02K 41/031* (2013.01); *H02K 2213/06* (2013.01)

(58) Field of Classification Search
CPC ... H02P 5/74; H02P 25/06; H02P 6/16; H02K 41/02; B02C 17/24
See application file for complete search history.

(56) References Cited

U.S. PATENT DOCUMENTS

| | | | |
|---|---|---|---|
| 5,670,856 A | 9/1997 | Le et al. | |
| 8,450,894 B2 | 5/2013 | Blanding et al. | |
| 8,794,610 B2 * | 8/2014 | Sakai | G01B 5/008 269/55 |

(Continued)

FOREIGN PATENT DOCUMENTS

| | | |
|---|---|---|
| CN | 104779772 A | 7/2015 |
| DE | 10152260 A1 | 4/2003 |

(Continued)

OTHER PUBLICATIONS

Extended European Search Report dated Sep. 14, 2017, issued during the prosecution of corresponding European Patent Application No. EP 17162294.7 (7 pages).

(Continued)

*Primary Examiner* — Zoheb S Imtiaz
(74) *Attorney, Agent, or Firm* — Locke Lord LLP; Joshua L. Jones; Scott D. Wofsy

(57) ABSTRACT

A linear motor actuator includes a plurality of stators mounted stationary relative to one another along a common actuation axis. A translator rod is mounted to the stators for linear motion relative to the stators along the actuation axis, wherein each stator is magnetically coupled to the translator rod to drive motion of the translator rod along the actuation axis.

19 Claims, 2 Drawing Sheets

(56) References Cited

U.S. PATENT DOCUMENTS

| | | | |
|---|---|---|---|
| 9,318,942 B2 | 4/2016 | Sugita et al. | |
| 2003/0144805 A1* | 7/2003 | Shinohira | G01R 31/34 702/65 |
| 2008/0302115 A1 | 12/2008 | Eknes et al. | |
| 2010/0072924 A1* | 3/2010 | Shoda | H02P 25/064 318/135 |
| 2010/0171459 A1* | 7/2010 | Aso | G01D 5/2451 318/647 |
| 2010/0185320 A1* | 7/2010 | Nemeth-Csoka | B23Q 17/22 700/230 |
| 2010/0328889 A1 | 12/2010 | Campbell et al. | |
| 2011/0181129 A1* | 7/2011 | Aso | H02K 21/14 310/12.14 |
| 2015/0222167 A1 | 8/2015 | Aoyama et al. | |
| 2015/0276029 A1 | 10/2015 | Marvin et al. | |
| 2016/0329800 A1* | 11/2016 | Kano | H02K 41/031 |

FOREIGN PATENT DOCUMENTS

| | | | |
|---|---|---|---|
| EP | 2052968 A2 | 4/2009 | |
| JP | 5621267 B2 | 11/2014 | |

OTHER PUBLICATIONS

Extended European Search Report dated Feb. 26, 2018 issued during the prosecution of European Patent Application No. EP 17195113.0 (9 pages).
Communication pursuant to Article 94(3) EPC, dated Jul. 30, 2019, issued during the prosecution of European Patent Application No. EP 17195113.0, containing English translation of JP 5621267.

* cited by examiner

LINEAR MOTOR ACTUATORS

CROSS-REFERENCE TO RELATED APPLICATIONS

This application is a divisional of U.S. patent application Ser. No. 15/287,215 filed Oct. 6, 2016, which is incorporated by reference herein in its entirety.

BACKGROUND OF THE INVENTION

1. Field of the Invention

The present disclosure relates to actuators, and more particularly to linear motor actuators.

2. Description of Related Art

Actuators used in certain applications with high reliability requirements, such as in aerospace, are required to be jam free. Typical avionics grade actuators include gear trains and clutching in order to be jam free. Incorporating fly by wire electronic control technology into older or existing mechanical controlled aircraft requires installation of electrical actuators to replace mechanical control components and interface with the remaining mechanical systems.

The conventional techniques have been considered satisfactory for their intended purpose. However, there is an ever present need for improved electro-mechanical actuators (EMA's). This disclosure provides a solution for this problem.

SUMMARY OF THE INVENTION

A linear motor actuator includes a plurality of stators mounted stationary relative to one another along a common actuation axis. A translator rod is mounted to the stators for linear motion relative to the stators along the actuation axis, wherein each stator is magnetically coupled to the translator rod to drive motion of the translator rod along the actuation axis.

Each stator can include a plurality of phase windings configured to drive motion of the translator rod in a phased series of magnetic impulses from the phase windings. The translator rod can include a plurality of permanent magnets stacked along the actuation axis, wherein the permanent magnets and the phase windings of each of the stators are magnetically coupled to drive motion of the translator rod. The stators can be spaced apart from one another along the actuation axis, e.g., by a respective spacer between each pair of adjacent stators.

Each stator can include a separate respective controller for redundancy. A plurality of position sensors can be operatively connected to the stators and the translator rod for producing independent signals indicative of relative position of the stators and the translator rod. Each respective stator can be operatively connected to a respective one of the controllers and a respective one of the position sensors as an independent, redundant control loop. There can be three or more independent, redundant control loops each including a respective one of the stators, position sensors, and controllers. The three or more position sensors can be spaced apart circumferentially about the stators in a triangular cross-sectional configuration about the actuation axis.

The stators and translator rod can be configured to allow free motion of the translator rod under magnetic impulses from any remaining operational one more of the stators in the event of one or more of the stators going off line. The stators and translator rod can be reliable to equal or beat a failure rate of 1 in $10^9$ hours.

A module can be operatively connected to the independent, redundant control loops for coordinating cooperation among the stators. The module can be configured to keep all three (or more) stators active in actuating the translator rod as long as all three (or more) stators are on line. The module can be configured to slave a plurality of the stators as slave stators to one of the stators as a master stator to coordinate and avoid competing impulses from the stators on the translator rod. The module can be configured to detect going off line of the master stator and to reconfigure one of the slave stators as a new master stator in the event of the master stator going off line.

A method of controlling a linear actuator includes slaving a plurality of slave stators in a linear motor actuator to a master stator in the linear motor actuator, wherein each stator is magnetically coupled to a common translator rod to drive motion of the translator rod along an actuation axis. The method also includes detecting the master stator going off line and reconfiguring one of the slave stators as a new master stator and slaving any remaining operational slave stators to the new master stator. The method can also include re-engaging the previous master stator as a slave should it later be capable of returning to an online state.

Slaving the plurality of slave stators to a master stator can include coordinating to avoid competing impulses from the stators on the translator rod. The method can include controlling each stator with a respective, independent control loop, e.g., wherein each control loop includes a respective position sensor, controller, and stator. This coordination between master and slave stators during the reconfiguration of assignment of the stators' master and slave status can be utilized to eliminate uncommanded (and undesired) transients in translator rod position that could otherwise occur without the coordination.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
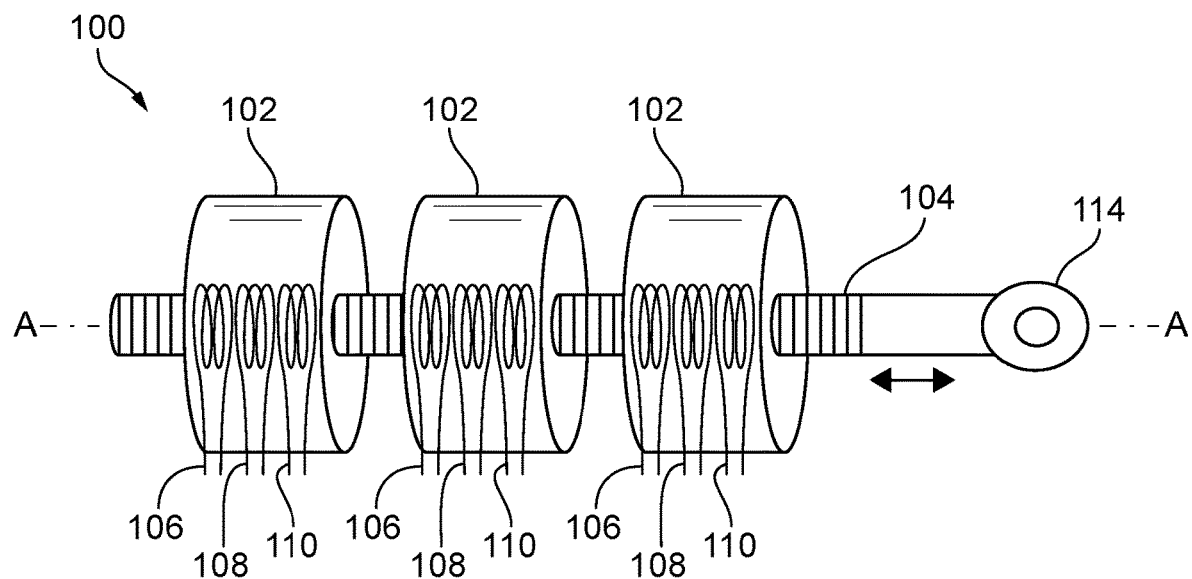
FIG. 1 is a schematic perspective view of a portion of an exemplary embodiment of a linear motor actuator constructed in accordance with the present disclosure, showing three redundant stators along the translator rod.

Reference will now be made to the drawings wherein like reference numerals identify similar structural features or aspects of the subject disclosure. For purposes of explanation and illustration, and not limitation, a partial view of an exemplary embodiment of a linear motor actuator in accordance with the disclosure is shown in FIG. 1 and is designated generally by reference character 100. Other embodiments of linear motor actuators in accordance with the disclosure, or aspects thereof, are provided in FIGS. 2-5, as will be described. The systems and methods described herein can be used to provide electro-mechanical actuators (EMA's) with multiple redundancies, jam free operation, and low failure rate, e.g., for use in fly by wire aerospace applications.

Linear motor actuator 100 includes a plurality of stators 102 mounted stationary relative to one another along a common actuation axis A. A translator rod 104 is mounted to the stators 102, e.g., with each stator 102 wrapped around translator rod 104, for linear motion relative to the stators 102 along the actuation axis A. Each stator 102 is magnetically coupled to the translator rod 104 to drive motion of the translator rod 104 along the actuation axis A as indicated by the double arrow in FIG. 1. Each stator 102 includes a plurality of phase windings, e.g., three phase windings 106, 108, and 110, each phased apart from the others by 120°, to drive motion of the translator rod 104 in a phased series of magnetic impulses from the phase windings 106, 108, and 110. This embodiment represents a typical 3-phase motor and control implementation, however, those skilled in the art will readily appreciate that any other suitable configuration of control mechanization is also possible, e.g. 2-phase, 4-phase, etc., without departing from the scope of this disclosure.

Figure 2:
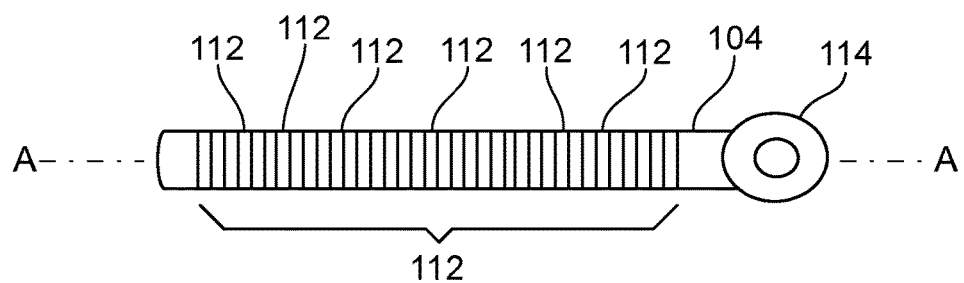
FIG. 2 is a schematic view of the translator rod of FIG. 1, showing the permanent magnets stacked along the actuation axis.
Figure 3:
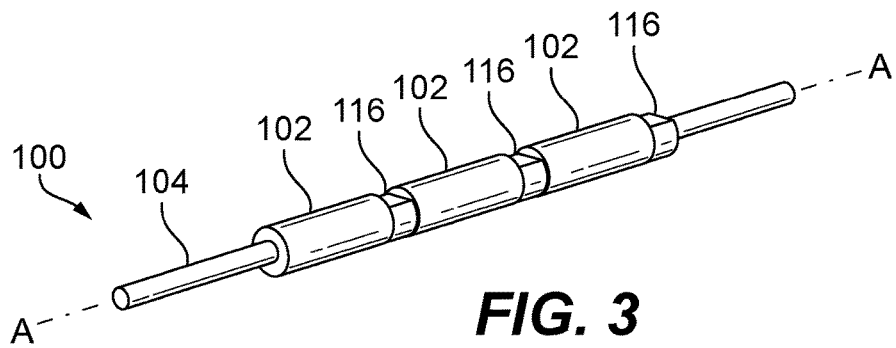
FIG. 3 is a perspective view of a portion of the linear motor actuator of FIG. 1, showing the spacing of the stators along the actuation axis.

Referring now to FIG. 2, the translator rod 104 includes a plurality of permanent magnets 112 stacked along the actuation axis A, not all of which are labeled in FIG. 2 for sake of clarity, and a clevis 114 for attachment of mechanical components to be actuated. The permanent magnets 112 and the phase windings 106, 108, and 110 of each of the stators 102 are magnetically coupled to drive motion of the translator rod 104 along the actuation axis A. As shown in FIG. 3, the stators 102 can be spaced apart from one another along the actuation axis A, e.g., by a respective wire/spacer 116 between each pair of adjacent stators 102.

Figure 4:
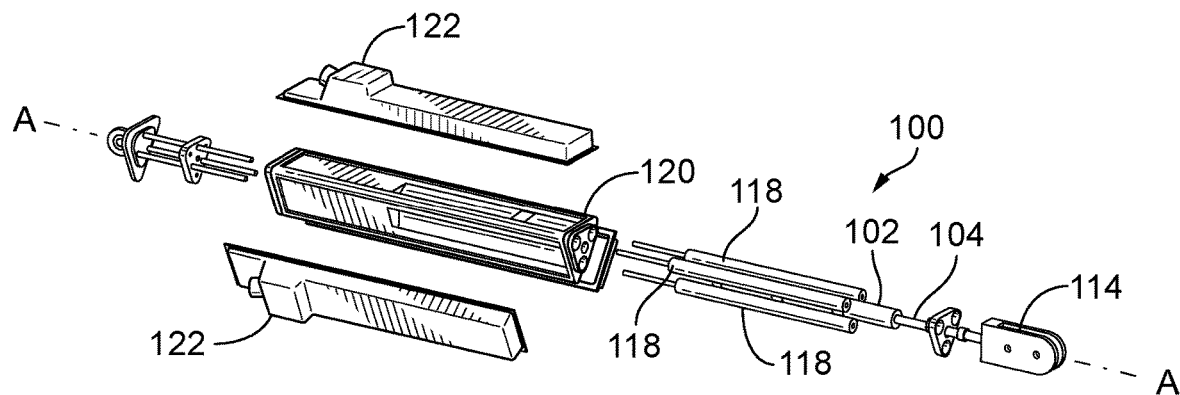
FIG. 4 is an exploded perspective view of the linear motor actuator of FIG. 1, showing the position sensors.

With reference now to FIG. 4, a plurality of position sensors 118 are operatively connected to the stators 102 and the translator rod 104 for producing independent signals indicative of relative position of the stators 102 and the translator rod 104. Any suitable type of position sensors can be used, such as linear variable differential transformers. Three position sensors 118 are spaced apart circumferentially about the stators 102 in a triangular cross-sectional configuration about the actuation axis A, and the position sensors 118 and stators 102 can be mounted in a triangular housing 120. Those skilled in the art will readily appreciate that any other suitable number of position sensors can be used without departing from the scope of this disclosure, such as mounting all position sensors side-by-side above or below the translator or any other suitable mounting position.

Figure 5:
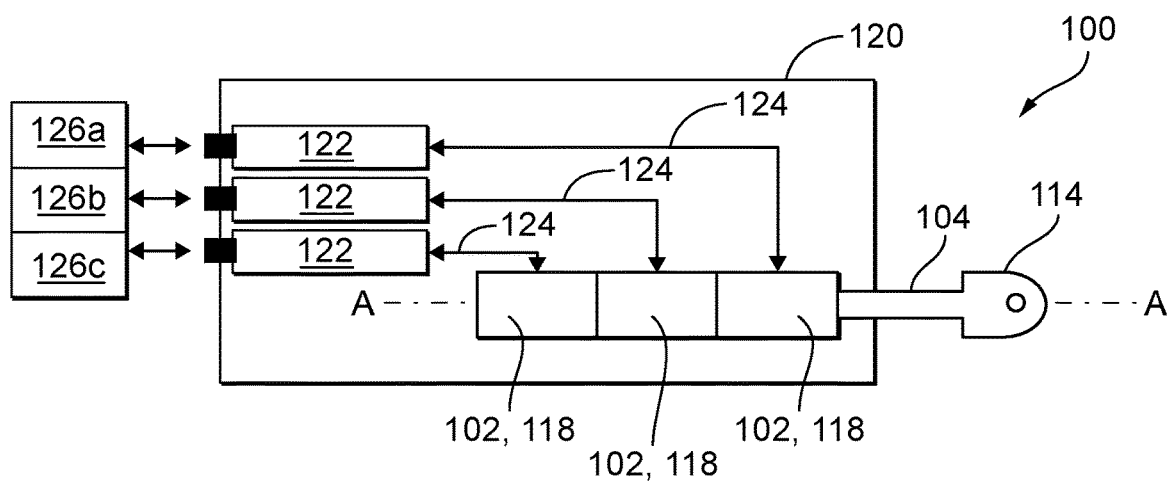
FIG. 5 is a schematic view of the linear motor actuator of FIG. 1, showing the control loops for the three stators.

Referring now to FIG. 5, each stator 102 includes a separate respective controller or control module 122 for redundancy, i.e., phase windings 106, 108, and 110 of each of the stators 102 are connected to the control module 122 of the respective stator 102. Each respective stator 102 is operatively connected to a respective one of the control module 122 and a respective one of the position sensors 118 as an independent, redundant control loop 124. There are three independent, redundant control loops 124 each including a respective one of the stators 102, position sensors 118, and control modules 122. Those skilled in the art will readily appreciate that any other suitable number of control loops can be used without departing from the scope of this disclosure.

The stators 102 and translator rod 104 are configured to allow free motion of the translator rod 104 under magnetic impulses from any remaining operational one more of the stators 102 in the event of one or more of the stators 102 failing or going off line. So as long as even only one stator 102 is functional, the linear motor actuator 100 can function as an EMA. In other words, failure of a stator 102 does not jam the linear motor actuator 100, making the linear motor actuator 100 jam free as well as having redundancy. This redundancy makes it possible for the stators 102 and translator rod 104 to be reliable to equal or beat a failure rate of 1 in $10^9$ hours, i.e., wherein failures occur less than 1 in $10°$ hours. Those skilled in the art will readily appreciate that other failure rates can be attained and/or numbers of stators can be used without departing from the scope of this disclosure.

Independent modules 126a, 126b, and 126c are operatively connected to the independent, redundant control loops 124. The modules 126a, 126b, and 126c can be redundant flight control computers, autopilot computers, vehicle management computers, or the like, that provide position and other configuration commands to the controllers or control modules 122. The control modules 122 are configured to force balance the stators 102 by slaving a plurality of the stators 102 as slave stators to one of the stators 102 as a master stator to coordinate and avoid competing impulses from the stators 102 on the translator rod 104. For example, one of the three stators 102 is the master and the other two stators 102 are slaves. If there is a discrepancy wherein the three control loops 124 are in disagreement with respect to the actual position of actuator rod 104 relative to the stators 102, rather than generate forces opposing one another to reach a command position, the stators will all conform to the position reading of the master stator 102. The control modules 122 can be configured to detect going off line of the master stator and to reconfigure one of the slave stators as a new master stator in the event of the master stator going off line. Those skilled in the art will readily appreciate that the control modules 122 can be co-located with the stators/translator or remotely mounted.

The electronics controllers that drive the stators and determine master/slave status are the controllers or control modules 122 in FIG. 5. The block with modules 126a, 126b, and 126c is, e.g., the upstream flight control system that provides position commands. This block can have the same redundancy as the motor controllers/control modules 122. Control modules 122 can do all of the decision making. The modules 126a, 126b, and 126c can optionally have the ability to override the decisions of control modules 122.

A method of controlling a linear actuator, e.g., linear motor actuator 100, includes slaving a plurality of slave stators, e.g., two of stators 102, in a linear motor actuator to a master stator, e.g., the remaining one of the three stators 102, in the linear motor actuator, wherein each stator is magnetically coupled to a common translator rod, e.g., translator rod 104, to drive motion of the translator rod along an actuation axis, e.g., actuation axis A. The method also includes detecting the master stator going off line and reconfiguring one of the slave stators as a new master stator and slaving any remaining operational slave stators to the new master stator.

The methods and systems of the present disclosure, as described above and shown in the drawings, provide for EMA's with superior properties including multiple redundancies for low failure rates. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A method of controlling a linear actuator comprising:
   slaving a plurality of slave stators in a linear motor actuator to a master stator in the linear motor actuator, wherein each stator is magnetically coupled to a common translator rod to redundantly drive motion of the translator rod along an actuation axis;
   detecting the master stator going off line; and
   reconfiguring one of the plurality of slave stators as a new master stator and slaving any remaining operational slave stators to the new master stator, wherein all of the stators are axially within an axial length of the translator rod.

2. A method as recited in claim 1, wherein slaving the plurality of slave stators to a master stator includes coordinating to avoid competing impulses from the stators on the translator rod.

3. A method as recited in claim 1, further comprising controlling each stator with a respective, independent control loop.

4. A method as recited in claim 1, further comprising controlling each stator with a respective, independent control loop, wherein each control loop includes a respective position sensor, controller, and stator.

5. A method as recited in claim 1, wherein each of the stators includes a plurality of phase windings configured to drive motion of the translator rod in a phased series of magnetic impulses from the phase windings.

6. A method as recited in claim 5, wherein the translator rod includes a plurality of permanent magnets stacked along the actuation axis, wherein the permanent magnets and the phase windings of each of the stators are magnetically coupled to drive motion of the translator rod.

7. A method as recited in claim 1, wherein each of the stators includes a separate respective controller for redundancy.

8. A method as recited in claim 7, further comprising a plurality of position sensors operatively connected to the stators and the translator rod for producing independent signals indicative of relative position of the stators and the translator rod.

9. A method as recited in claim 8, wherein each of the plurality of stators is operatively connected to a respective one of the controllers and a respective one of the position sensors as an independent, redundant control loop.

10. A method as recited in claim 9, further comprising three independent, redundant control loops each including a respective one of the stators, position sensors, and controllers.

11. A method as recited in claim 10, wherein the three position sensors are spaced apart circumferentially about the stators in a triangular cross-sectional configuration about the actuation axis.

12. A method as recited in claim 9, further comprising a module operatively connected to the independent, redundant control loops for coordinating cooperation among the stators.

13. A method as recited in claim 12, wherein the module is configured to keep all of the plurality of stators active in actuating the translator rod as long as all of the plurality of stators are on line.

14. A method as recited in claim 12, wherein the module is configured to slave a plurality of the stators as slave stators to one of the stators as a master stator to coordinate and avoid competing impulses from the stators on the translator rod.

15. A method as recited in claim 14, wherein the module is configured to detect going off line of the master stator and to reconfigure one of the slave stators as a new master stator in the event of the master stator going off line.

16. A method as recited in claim 1, wherein the stators and translator rod are configured to allow free motion of the translator rod under magnetic impulses from any remaining operational one more of the stators in the event of one or more of the stators going off line.

17. A method as recited in claim 1, wherein the stators and translator rod are reliable to equal or beat a failure rate of 1 in $10^9$ hours.

18. A method as recited in claim 1, wherein the stators are spaced apart from one another along the actuation axis.

19. A method as recited in claim 18, wherein the stators are spaced apart from one another by a respective spacer between each pair of adjacent stators.

* * * * *